United States Patent [19]
Ookubo

[11] Patent Number: 5,283,614
[45] Date of Patent: Feb. 1, 1994

[54] OPTICAL SYSTEM MOVING FRAME UNIT FOR USE IN AN EXPOSURE DEVICE OF AN OPTICAL SYSTEM MOVEMENT TYPE

[75] Inventor: Kenzou Ookubo, Osaka, Japan
[73] Assignee: Mita Industrial Co., Ltd., Osaka, Japan
[21] Appl. No.: 32,206
[22] Filed: Mar. 15, 1993

Related U.S. Application Data
[63] Continuation of Ser. No. 786,177, Oct. 31, 1991, abandoned.

[30] Foreign Application Priority Data
Oct. 31, 1990 [JP] Japan ................. 2-296620

[51] Int. Cl.$^5$ .......................... G03G 15/28
[52] U.S. Cl. ..................... 355/233; 248/638; 248/903; 355/236
[58] Field of Search ............... 355/233, 235, 236, 234; 52/602, 630, 694, 729; 248/638, 903

[56] References Cited
U.S. PATENT DOCUMENTS 4,409,771 10/1983 Lowe ........................ 52/729
4,728,988 3/1988 Tsutsui et al. ............... 355/235
4,931,836 6/1990 Matsushita et al. ........... 355/233
5,072,570 12/1991 Johnson ................... 248/638 X

FOREIGN PATENT DOCUMENTS 0022454 3/1981 Japan ..................... 355/236
1-116664 5/1989 Japan .
1-79168 7/1989 Japan ..................... 355/236

Primary Examiner—A. T. Grimley
Assistant Examiner—Sandra L. Brasé
Attorney, Agent, or Firm—Cushman, Darby & Cushman

[57] ABSTRACT

An optical system moving frame unit to be used in an optical system movement type exposure device, which is cast into a rectangular frame reinforced with reinforcing ribs and thin planar members. The reinforcing ribs are arranged as in a trussed structure. The thin planar members cover the spaces defined by the frame and the reinforcing ribs in such a manner as to be integrated with the frame and the reinforcing ribs. The provision of the thin planar members eliminates the problem that the casting material does not flow smoothly into the cavities for the reinforcing ribs in a casting process of the optical system moving frame unit.

22 Claims, 4 Drawing Sheets

OPTICAL SYSTEM MOVING FRAME UNIT FOR USE IN AN EXPOSURE DEVICE OF AN OPTICAL SYSTEM MOVEMENT TYPE

This is a continuation of application No. 07/786,177, filed on Oct. 31, 1991, which was abandoned upon the filing hereof.

BACKGROUND OF THE INVENTION

1. Field of the Invention

This invention relates to a frame unit which forms a part of an optical system movement type exposure device to be used in an image forming apparatus such as an electrophotographic printing machine or printer.

2. Description of the Related Art

Applicant has filed an unexamined, published Japanese Patent Application No. 116664/1989 directed to an optical system moving frame unit which is substantially free from twisting vibration or vertical vibration. A reduction in vibration reduces the chances that the formation of images will be adversely affected by external exciting forces. This optical system moving frame unit economically utilizes space and reduces the weight of the exposure device.

The optical system moving frame unit is made up of a rectangular frame reinforced with reinforcing ribs arranged as in a trussed structure. A rectangular frame wastes less space than a trapezoidal frame. The reinforcing ribs increase the natural frequency of the optical system moving frame unit. A higher natural frequency substantially decreases the twisting vibration or vertical vibration attributing to external exciting forces.

However, the optical system moving frame unit suffers from the following problems when it is produced by large scale casting. Molten aluminum does not flow smoothly into the cavities for the reinforcing ribs in the casting operation, so blowholes are likely to be formed in the resultant reinforcing ribs. Therefor, some of the reinforcing ribs are not completely formed because the cavities for the reinforcing ribs are not sufficiently filled with the molten aluminum.

SUMMARY OF THE INVENTION

An object of this invention is to provide an improved moving frame unit to be used in an optical system movement type exposure device which is free from the above-described difficulties accompanying a conventional optical system moving frame unit. According to this invention, the moving frame unit includes a rectangular frame reinforced with reinforcing ribs arranged as in a trussed structure such that it is free from twisting vibration or vertical vibration attributing to external exciting forces. Thin planar members are coupled to the frame and to the reinforcing ribs to facilitate the filling of casting mold cavities.

The nature, utility and principle of the invention will be more clearly understood from the following detailed description and the appended claims when read in conjunction with the accompany drawings.

DETAILED DESCRIPTION OF THE INVENTION

The preferred embodiments of the invention will be described with reference to the accompanying drawings.

Figure 1:
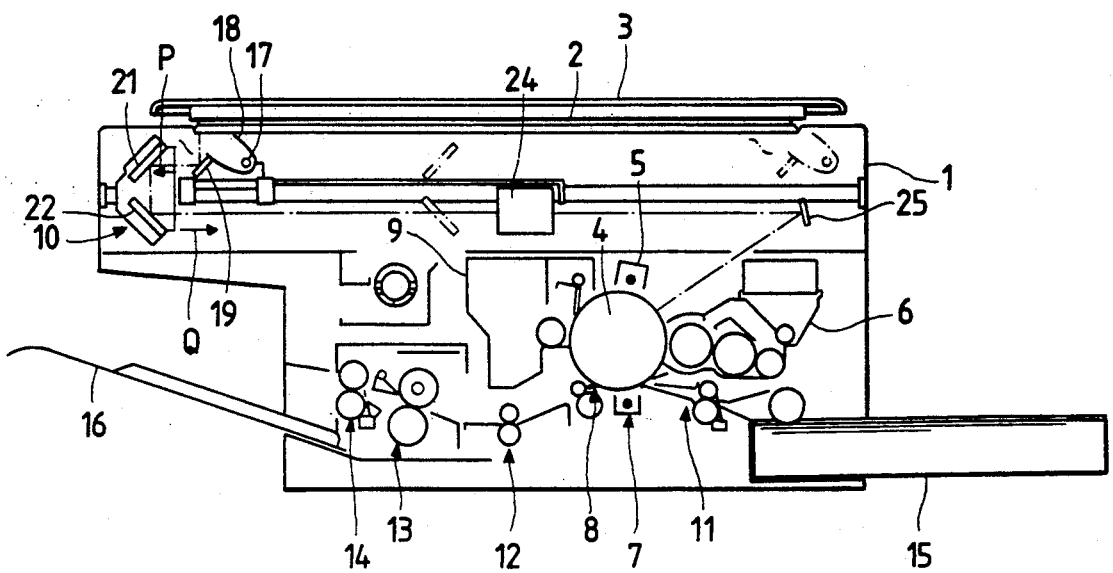
FIG. 1 is a side view outlining the application of the technical concept of the invention to an electrophotographic printing machine, which is an example of an image forming apparatus.

FIG. 1 shows an electrophotographic printing machine which is an example of an image-forming device. An original to be copied is placed between an original retainer 3 and a glass plate 2. The retainer 3 and the glass plate 2 are on top of a copy machine body 1. Clean sheet paper is placed in a sheet supply cassette 15. The clean sheet paper is feed to a photo-sensitive body 4 by a sheet supply conveyor unit 11. The original is illuminated by a light source 17 and a reflector 18. The illuminating light is reflected off of the original and travels to a first mirror 19. The first mirror 19 reflects the light to a second mirror 21. A third mirror 22 receives the reflected light from the second mirror 21. A lens unit 24 receives the reflected light from the second mirror 21. The lens unit 24 concentrates the light as it passes through the lens unit 24 on its way to a fourth mirror 25. The fourth mirror 25 reflects the light received from the lens unit 24 to the photo-sensitive body 4. (the dash line shows the light path) This light contains a reflected image of the original to be copied. An exposure device 10 is made up of the light source 17, the reflector 18, the lens unit 24, and the first, second and third mirrors 19, 21, and 22 respectively. The photo-sensitive body 4 is charged by a charging unit 5. The image of the original which was reflected to the photo-sensitive body 4 is generated on the copy sheet paper by a transfer unit 7 and a developing unit 6. A cleaning unit 9 cleans the photo-sensitive body. The copy sheet paper is further fed to a copy sheet separation unit 8. A sheet discharging conveyor unit 12 feeds the copy sheet to a fixing unit 13. The fixing unit 13 fixes the copied image. A pair of sheet discharging rollers 14 feed the copy paper to a sheet discharge tray 16.

Figure 2:
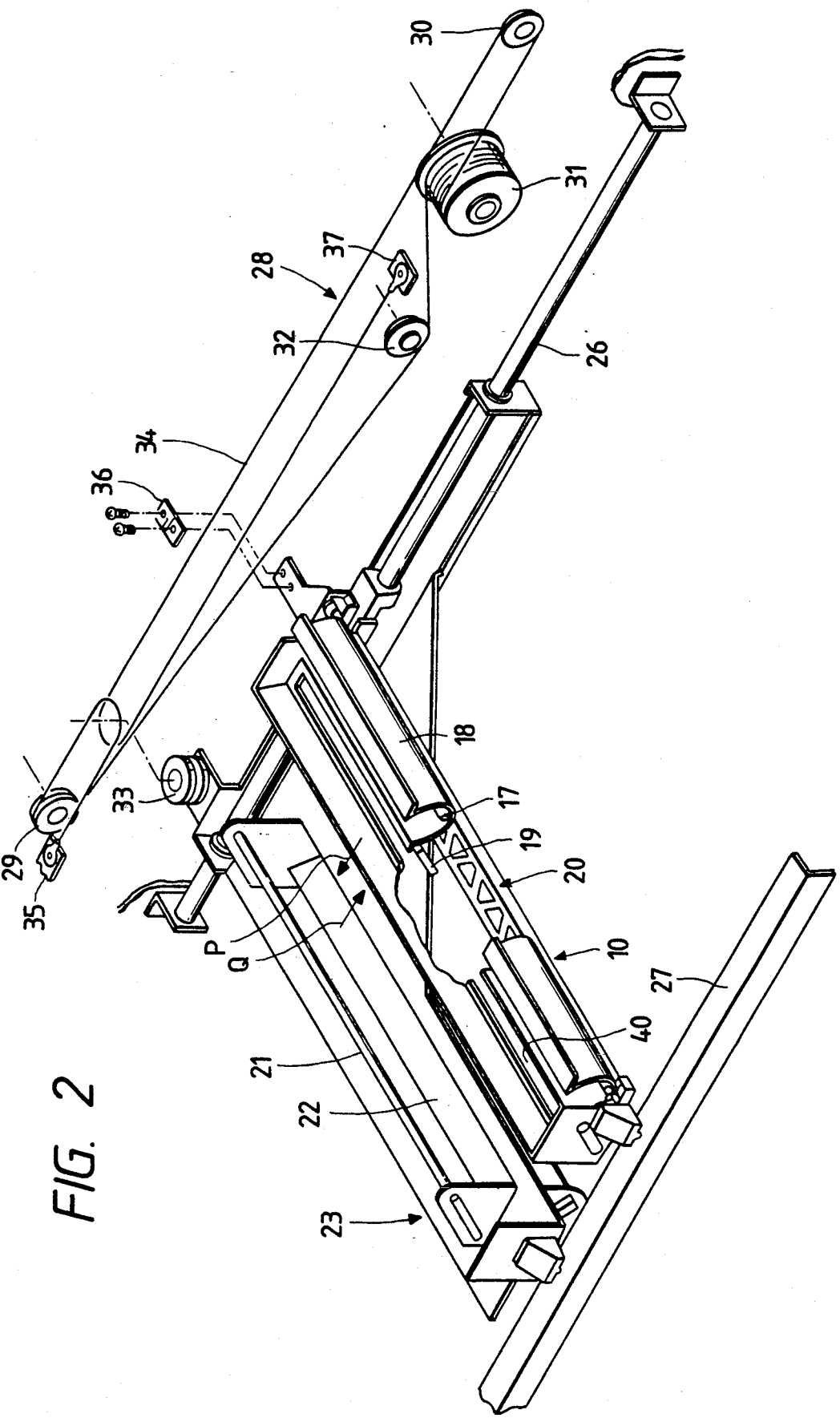
FIG. 2 is a perspective view showing the exposure device, and its driving unit.

FIG. 2 shows an exploded view of the exposure device 10. Light is emitted by the light source 17 and reflected by the reflector 18. This light is reflected off of the original to be copied. The reflected light travels through an opening 40 to the first mirror 19. The first mirror 19 passes the light to the second mirror 21 in the direction of arrow P. The third mirror 22 receives this light and passes it on for further processing in the direction of arrow Q. This light contains a reflected image of the original to be copied.

The exposure device 10 is supported on one side by a supporting rod 26 and on the other side by a supporting member 27. The supporting rod and supporting member allow the movement of the first and second moving frame units 20 and 23 respectively. They can move in both directions P and Q. An optical system driving unit 28 moves the moving frame units 20 and 23. A power transmission wire 34 moves the exposure device 10. The power transmission wire 34 is wrapped around idling roller 33 to move the second moving frame unit 23. The second moving frame unit 23 can move in directions P and Q. The power transmission wire 34 is also attached to the first moving frame unit 20 with a fixing means 36. The first moving frame unit 20 can move in directions P and Q also. A roller coupled to a motor 31 (the motor is not shown in the Figure) supplies the power transmission wire 34 with a torque. Stationary portions 35 and 37 are attached at both ends of the power transmission wire 34 to anchor it. The power transmission wire 34 is wrapped around a set of direction changing rollers 29 and 30 to reverse the direction of the wire. The power transmission wire 34 reverses direction so it can wrap around the rollers previously mentioned and an intermediate roller 32. The intermediate roller 32 maintains a predetermined tension in the power transmission wire 34.

As the electric motor is rotated in the forward direction the first and second moving frame units 20 and 23 respectively are reciprocated in the same direction. The length of the optical path between the light source 17 and the lens unit 24 remains unchanged. To achieve this, the first moving frame unit 20 moves twice as fast as that of the second moving frame unit 23. The same is true if the motor is rotated in the reverse direction.

Figure 3:
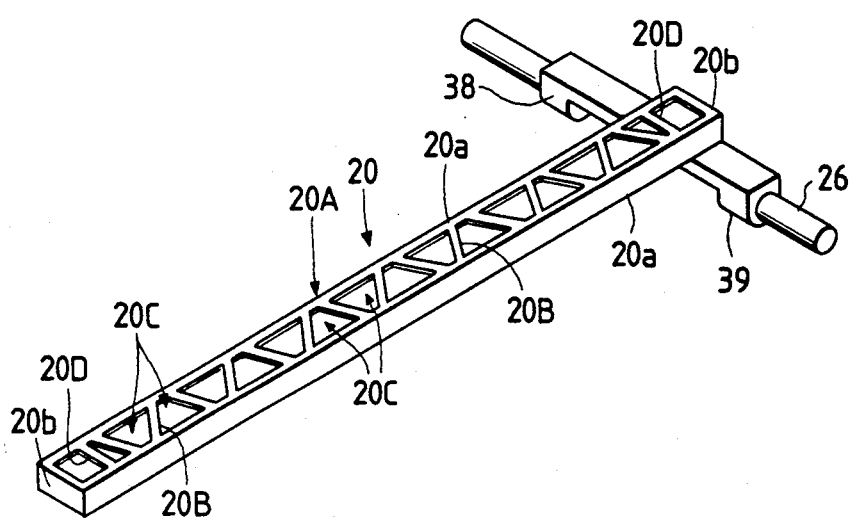
FIG. 3 is a perspective view outlining the structure of an example of a moving frame unit in an optical system movement type exposure device according to this invention.
Figure 4:
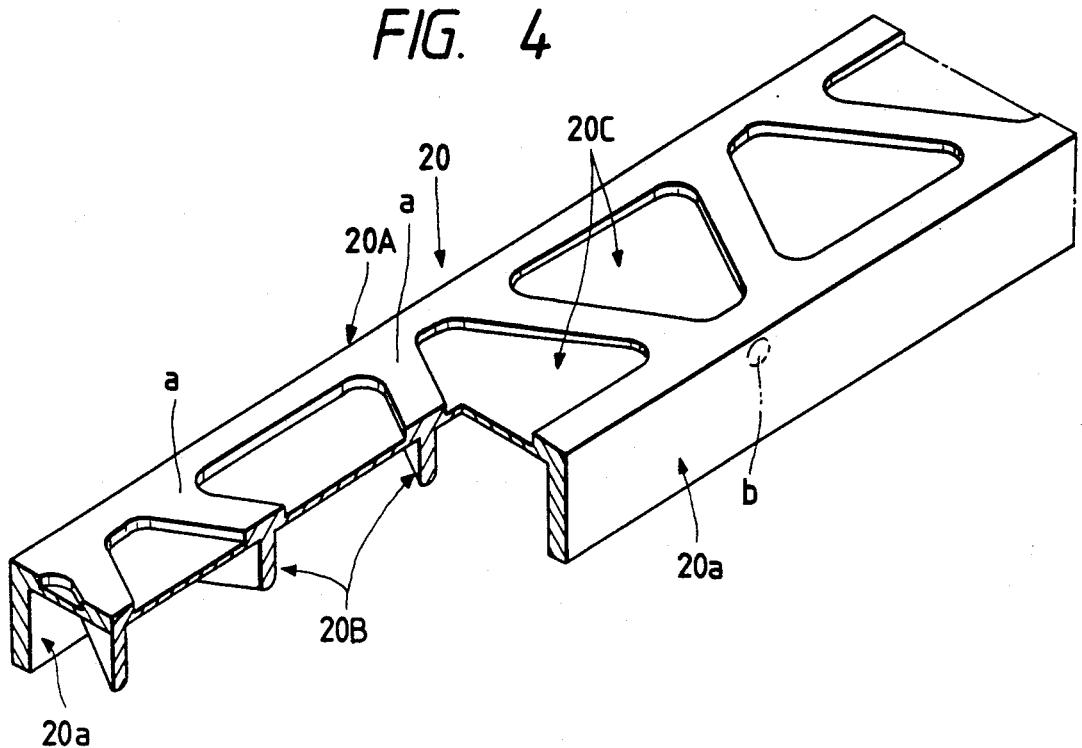
FIG. 4 is a perspective view, with parts cut away, showing a part of the moving frame unit according to the invention.
Figure 5:
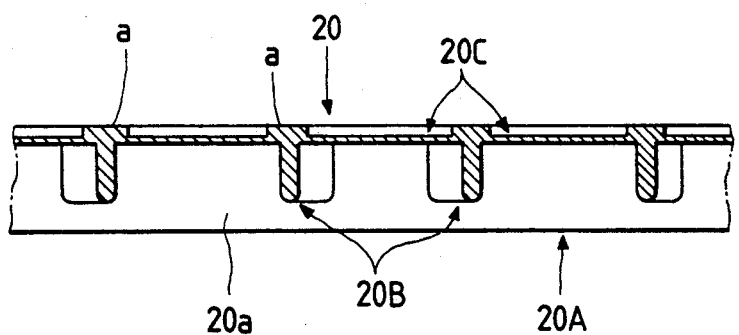
FIG. 5 is a longitudinal sectional side view showing part of the moving frame unit.
Figure 6:
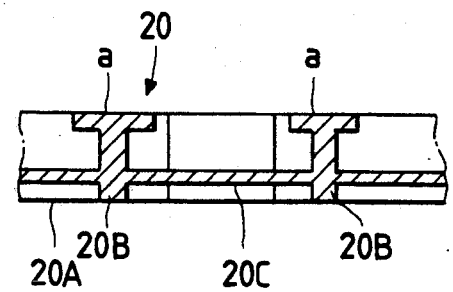
FIGS. 6, 7(A), 7(B) and 7(C) are sectional views showing part of other examples of the moving frame unit according to the invention.

FIG. 3 is a perspective view of a first embodiment of moving frame unit 20. FIGS. 4, 5, and 6 are cut-away views of FIG. 3. One end portion of moving frame unit 20 is supported by the supporting rod 26 through two sets of bearings 38 and 39. The other end portion of moving frame unit 20 is supported by supporting member 27 (see FIG. 2). Moving frame unit 20 has a rectangular frame 20A. Parallel longside members 20a make up the long sides of the rectangular frame 20A. Parallel shortside members 20b make up the short sides of the rectangular frame 20A. A cross-sectional view of the sides shows that they are L-shaped in cross-section as is shown in FIG. 4. Reinforcing ribs 20B are arranged as in a trussed structure between the parallel longside members 20a. FIGS. 4 and 5 show that the reinforcing ribs 20B are T-shaped in cross-section. The T shape makes the moving frame unit mechanically strong. Thin planar members 20C join the reinforcing ribs 20B, the parallel longside members 20a, and rib members 20D. The thin planar members 20C are generally in the upper portion of the moving frame member 20 (or 23). The thin planar member 20C increases the natural frequency of the moving frame unit 20 (or 23). The first mirror 19 (or other components of the exposure device) can be stably mounted on an upper surface portion a (shown in FIG. 4) of the moving frame unit. A gate b is located where the thin planar members 20C join the reinforcing ribs 20B, and the parallel longside members 20a as shown by the phantom line in FIG. 4.

The first moving frame unit 20 is formed by casting aluminum which is light in weight and high in rigidity. However, it may be formed by casting BMC resin or glass-mixed resin.

The natural frequency of the moving frame unit 20 is the highest when the thin planar members 20C occupy the upper portion of the moving frame unit. The twisting vibration or vertical vibration of the moving frame unit 20 which attributes to an external exciting force is effectively prevented when the natural frequency is high. However, the thin planar members 20C may be connected to the lower portions of the reinforcing ribs 20B as shown in FIG. 6.

Figure 7A:
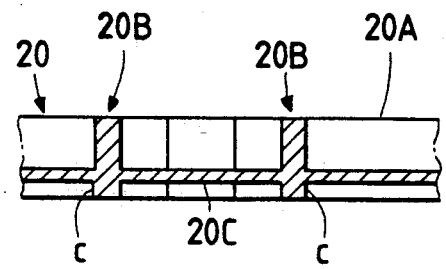
Figure 7B:
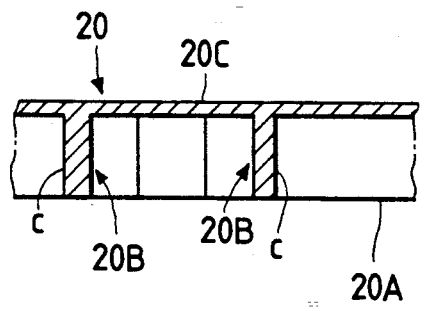
Figure 7C:
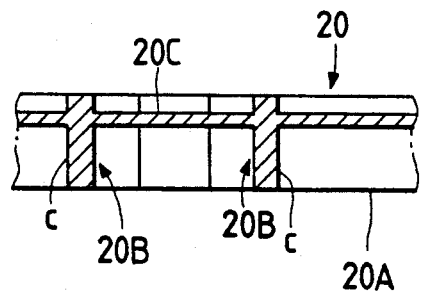

FIGS. 7(A), 7(B) and 7(C) show different examples of the moving frame unit. Different placements of the thin planar members 20C are shown in these examples. FIG. 7(A) shows the planar members connected to the lower portion of the reinforcing ribs 20B. FIG. 7(B) shows the planar members connected to the upper portion of the reinforcing ribs 20B. FIG. 7(C) shows the planar members connected to the middle portion of the reinforcing ribs 20B.

In casting the moving frame unit it is difficult to position the gate b so that it intersects with the thin planar member 20C if the planar member is connected to the upper portion of the reinforcing ribs 20B as is shown in FIG. 7(B). In view of the casting operation, it is preferable to connect the planar member to either the lower portion or the middle portion of the reinforcing ribs 20B as shown in FIG. 7(A) or 7(C).

The sectional configuration of the reinforcing ribs 20B and the arrangement of the thin planar members 20C are not limited to those described above, for example, they may be L-shaped or rectangular shaped.

It goes without saying that the second moving frame unit can be formed in the same manner as the first moving frame unit described above.

The moving frame unit described above utilizes thin planar members in such a manner that they merge with the frame and the reinforcing ribs. The casting material can flow through casting mold cavities for the frame as well as cavities for the thin planar members. This facilitates the filling of cavities in the casting mold with the casting material. Thus the cavities for the reinforcing ribs are sufficiently filled with the casting material, and the formation of blowholes is eliminated. The thin planar members decrease the twisting vibration due to the increased strength added by them. Thus the moving frame unit of the invention performs well.

In addition, the planar members are thin. Therefore, the addition of the planar members does not substantially increase the weight of the moving frame unit. The object of the invention has been achieved by a simple improvement technique. The addition of the thin planar members to the moving frame unit.

While the preferred embodiments of the invention have been described, it will be obvious to those skilled in the art that various changes and modifications may be made without departing from the spirit of the invention, therefor it is aimed to cover all such changes and modifications as fall within the true spirit and scope of the invention in the appended claims.

What is claimed is:

1. A moving frame unit for use in an optical system movement type exposure device comprising:
    a rectangular shaped frame portion having a top, bottom and a proximal and distal side;
    reinforcing rib portions located between the top and bottom of the frame portion which are arranged as in a trussed structure to reinforce the proximal and distal sides of the rectangular frame portion; and
    a thin planar member portion located between the top and bottom of the rectangular shaped frame portion and which is provided in spaces defined by the frame and the reinforcing ribs in such a manner as to merge with the proximal and distal sides and the reinforcing ribs, wherein the thin planar member portion has a thickness substantially less than the frame portion and the reinforcing rib portions.

2. A moving frame unit as in claim 1, wherein the thin planar member portions are provided in such a manner that they merge with the frame and the reinforcing ribs in an upper portion of the rectangular solid-shaped frame portion.

3. A moving frame unit as in claim 1, wherein the thin planar member portions are provided in such a manner that they merge with the frame and the reinforcing ribs in a middle portion of the rectangular solid-shaped frame portion.

4. A moving frame unit as in claim 1, wherein the thin planar member portions are provided in such a manner that they merge with the frame and the reinforcing ribs in a lower portion of the rectangular solid-shaped frame portion.

5. A moving frame unit as in claim 1, wherein the reinforcing rib portions are T-shaped in cross-section.

6. A moving frame unit as in claim 5, wherein the thin planar member portions are provided in such a manner that they merge with the frame and the reinforcing ribs in an upper portion of the rectangular solid-shaped frame portion.

7. A moving frame unit as in claim 6, wherein a mirror member is mounted on an upper surface portion of said moving frame unit.

8. A moving frame unit as in claim 5, wherein the thin planar member portions are provided in such a manner that they merge with the frame and the reinforcing ribs in a middle portion of the rectangular solid-shaped frame portion.

9. A moving frame unit as in claim 5, wherein the thin planar member portions are provided in such a manner that they merge with the frame and the reinforcing ribs in a lower portion of the rectangular solid-shaped frame portion.

10. A moving frame unit as in claim 1, wherein the reinforcing rib portion is rectangular in cross-section.

11. A moving frame unit as in claim 10, wherein the thin planar member portions are provided in such a manner that they merge with the frame and the reinforcing ribs in an upper portion of the rectangular solid-shaped frame portion.

12. A moving frame unit as in claim 10, wherein the thin planar member portions are provided in such a manner that they merge with the frame and the reinforcing ribs in a middle portion of the rectangular solid-shaped frame portion.

13. A moving frame unit as in claim 10, wherein the thin planar member potions are provided in such a manner that they merge with the frame and the reinforcing ribs in a lower portion of the rectangular solid-shaped frame portion.

14. A moving frame unit as in claim 1, wherein the reinforcing rib portions are L-shaped in cross-section.

15. A moving frame unit as in claim 14, wherein the thin planar member portions are provided in such a manner that they merge with the frame and the reinforcing ribs in an upper portion of the rectangular solid-shaped frame portion.

16. A moving frame unit as in claim 14, wherein the thin planar member portions are provided in such a manner that they merge with the frame and the reinforcing ribs in a middle portion of the rectangular solid-shaped frame portion.

17. A moving frame unit as in claim 14, wherein the thin planar member portions are provided in such a manner that they merge with the frame and the reinforcing ribs in a lower portion of the rectangular solid-shaped frame portion.

18. An apparatus as in claim 1, wherein the rectangular solid-shaped frame portion is formed by a casting mold.

19. An apparatus as in claim 1, wherein the rectangular solid-shaped frame portion, reinforcing rib portions, and the thin planar member portion are formed by a casting mold from a common material.

20. An apparatus as in claim 19, wherein the common material comprises an aluminum.

21. An apparatus as in claim 19, wherein the common material comprises a BMC resin.

22. An apparatus as in claim 19, wherein the common material comprises a glass-mixed resin.

* * * * *